(12) United States Patent
Lazar

(10) Patent No.: US 8,438,378 B2
(45) Date of Patent: May 7, 2013

(54) SYSTEMS AND METHODS FOR TUNING AN OPERATING SYSTEM, APPLICATION, OR NETWORK COMPONENT

(75) Inventor: Michael Lazar, Lafayette, NJ (US)

(73) Assignee: Veloxum LLC, Lafayette, NJ (US)

(*) Notice: Subject to any disclaimer, the term of this patent is extended or adjusted under 35 U.S.C. 154(b) by 665 days.

(21) Appl. No.: 12/488,362

(22) Filed: Jun. 19, 2009

(65) Prior Publication Data

US 2009/0327689 A1 Dec. 31, 2009

Related U.S. Application Data

(60) Provisional application No. 61/075,618, filed on Jun. 25, 2008.

(51) Int. Cl.
*G06F 15/177* (2006.01)
*G05B 13/00* (2006.01)

(52) U.S. Cl.
USPC ........ 713/100; 713/1; 713/2; 700/28; 700/32; 700/33; 700/34; 702/182; 709/223; 709/224; 709/225; 709/226

(58) Field of Classification Search .................. 713/1, 2, 713/100; 700/28–34; 702/182; 709/223–226
See application file for complete search history.

(56) References Cited

U.S. PATENT DOCUMENTS

| 4,368,509 | A | 1/1983 | Li ................................ 364/148 |
| 5,696,701 | A | 12/1997 | Burgess et al. .......... 364/551.01 |
| 5,875,306 | A | 2/1999 | Bereiter ..................... 395/200.5 |
| 6,456,306 | B1 | 9/2002 | Chin et al. .................... 345/810 |
| 6,606,585 | B1 | 8/2003 | Borowsky et al. ................ 703/2 |
| 6,691,067 | B1 | 2/2004 | Ding et al. ..................... 702/186 |
| 6,934,931 | B2 | 8/2005 | Plumer et al. ................. 717/104 |
| 6,970,924 | B1 | 11/2005 | Chu et al. ...................... 709/224 |
| 6,973,491 | B1 | 12/2005 | Staveley et al. .............. 709/224 |
| 6,983,317 | B1 | 1/2006 | Bishop et al. ................. 709/223 |
| 7,225,250 | B1 | 5/2007 | Harrop ......................... 709/224 |
| 7,269,625 | B1 | 9/2007 | Willhide et al. .............. 709/206 |
| 7,290,048 | B1 | 10/2007 | Barnett et al. ................ 709/223 |
| 7,313,625 | B2 | 12/2007 | Tindal et al. .................. 709/228 |
| 7,463,595 | B1 * | 12/2008 | Singhal et al. ................ 370/254 |
| 7,490,234 | B2 * | 2/2009 | Liu et al. ........................... 713/1 |
| 2002/0078223 | A1 | 6/2002 | Baldonado et al. ........... 709/232 |
| 2002/0083163 | A1 | 6/2002 | Collazo ........................ 709/223 |
| 2002/0152304 | A1 | 10/2002 | Collazo ........................ 709/224 |
| 2002/0178248 | A1 | 11/2002 | Collazo ........................ 709/223 |

(Continued)

OTHER PUBLICATIONS

International Search Report and the Written Opinion of the International Searching Authority, application No. PCT/US2009/047963, dated Aug. 6, 2009.

(Continued)

*Primary Examiner* — Fahmida Rahman
(74) *Attorney, Agent, or Firm* — Winston & Strawn LLP

(57) ABSTRACT

A method, system, apparatus, and media are directed to tuning a device. Values are stored for each of a plurality of device parameters based on device metrics. The device parameters are constraint-matched over changes to settings of the device parameters to identify at least one point within each range of the device parameters that optimizes a performance measure for the device. Tuning values are selected for each device parameter based on the identified point. The tuning values are provided for tuning the device. The device is tuned with roll-back based on the running values.

13 Claims, 8 Drawing Sheets

U.S. PATENT DOCUMENTS

| | | | |
|---|---|---|---|
| 2004/0081201 A1 | 4/2004 | Simonnet et al. | 370/469 |
| 2005/0010388 A1* | 1/2005 | Bagchi et al. | 703/22 |
| 2005/0086242 A1 | 4/2005 | Ngai et al. | 707/100 |
| 2006/0092861 A1 | 5/2006 | Corday et al. | 370/256 |
| 2006/0136582 A1 | 6/2006 | Mills | 709/224 |
| 2007/0115916 A1 | 5/2007 | Nguyen et al. | 370/351 |
| 2007/0179919 A1 | 8/2007 | Kropaczek et al. | 706/19 |
| 2007/0266134 A1 | 11/2007 | Shyy et al. | 709/223 |
| 2007/0274337 A1 | 11/2007 | Purpura | 370/465 |
| 2007/0288633 A1 | 12/2007 | Mullarkey | 709/224 |
| 2007/0294399 A1 | 12/2007 | Grossner et al. | 709/224 |

OTHER PUBLICATIONS

Joseph A. Barrera III, "Self-Tuning Systems Software," Proceedings of the Fourth Workshop on Workstation Operating Systems; IEEE Computer Society, Napa, CA, pp. 194-194, Oct. 1993.

Harsh Bhaiya et al., "Project REAL: Enterprise Class Hardware Tuning for Microsoft Analysis Services," Unisys Corporation, Sep. 2006.

Mauro Caporuscio et al., "Model-based system reconfiguration for dynamic performance mamangement," The Journal of Systems and Software, vol. 80, No. 4, pp. 455-473 (2007).

Jon Inouye et al., "Dynamic Network Reconfiguration Support for Mobile Computers," International Conference on Mobile Computing and Networking, Proceedings of the 3rd Annual ACM/IEEE International Conference on Mobile Computing and Networking; Budapest, Hungary, pp. 13-22, 1997.

Hiroki Matsutani et al., "Performance Oriented Management System for Reconfigurable Network Appliances," The First International Workshop on Networked Sensing Systems (INSS), Tokyo, Japan, pp. 129-133, 2004.

Nathan J. Muller, "Improving Network Operations with Intelligent Agents," International Journal of Network Management, vol. 7, pp. 116-126, 1997.

Tiina Niklander, "Self-healing systems—What are they?", Seminar Introduction, 2007.

Andreas Rashe et al., "Configuration and Dynamic Reconfiguration of Component-based Applications with Microsoft.NET," Proceedings of the Sixth IEEE International Symposium on Object-Oriented Real-Time Distributed Computing (ISORC'03), 2003.

Erik Vonnahme et al., "Dynamic reconfiguration of real-time network interfaces," Proceedings of the International Conference on Parallel Computing in Electrical Engineering (PARELEC'04) 2004.

* cited by examiner

| Device Parameter (Type) | Value Type | OS | Value Range | Location |
|---|---|---|---|---|
| MTU | MTU | Windows | 88-9000 | HKLM\CurrentControlSet\Tcpip\Parameters |
| TCPWindowSizeREAD | TcpWindowsSize | Windows | 0-1973741823 | HKLM\CurrentControlSet\Tcpip\Parameters |
| TCPWindowSizeWRITE | TcpWindowsSize | Windows | 0-1973741823 | HKLM\CurrentControlSet\Tcpip\Parameters |
| RFC1323 | Tcp1323Opts | Windows | 0-3 | HKLM\CurrentControlSet\Tcpip\Parameters |
| Receive | DefaultReceiveWindow | Windows | 0-1973741823 | HKLM\CurrentControlSet\AFD\Parameters |
| Send | DefaultSendWindow | Windows | 0-1973741823 | HKLM\CurrentControlSet\AFD\Parameters |
| MTU | ifconfig eth | Linux2.6 | 88-9000 | ifconfig eth |
| TCPWindowSizeREAD | net.ipv4.tcp_mem | Linux2.6 | 0-1973741823 | net.ipv4.tcp_mem |
| TCPWindowSizeWRITE | net.ipv4.tcp_wmem | Linux2.6 | 0-1973741823 | net.ipv4.tcp_wmem |
| RFC1323 | timestamps | Linux2.6 | 0-1 | /proc/sys/net/ipv4/tcp_timestamps |
| RFC1323 | tcp_window_scaling | Linux2.6 | 0-1 | /proc/sys/net/ipv4/tcp_window_scaling |
| RFC1323 | tcp_sack | Linux2.6 | 0-1 | /proc/sys/net/ipv4/tcp_sack |
| Receive | net.core.rmem_max | Linux2.6 | 0-4194304 | net.core.rmem_max |
| Send | net.core.wmem_max | Linux2.6 | 0-4194304 | net.core.wmem_max |
| Max Simultaneous Connections | MaxConnectionsPer1_0Server | Windows | 0-20 | HKCU/Software/Microsoft/Windows/CurrentVersion/Internet Settin |
| Max Simultaneous Connections1_0 | MaxConnectionsPer_Server | Windows | 0-20 | HKCU/Software/Microsoft/Windows/CurrentVersion/Internet Settin |
| Max Simultaneous Connections | N/A | Linux | | |
| Max Simultaneous Connections1_0 | N/A | Linux | | |

FIG. 4A

| Device Parameter (Type) | Service |
|---|---|
| MTU | TCP |
| TCPWindowSizeREAD | TCP |
| TCPWindowSizeWRITE | TCP |
| RFC1323 | TCP |
| Max Simultaneous Connections | Internet Explorer |
| Max Simultaneous Connections1_0 | Internet Explorer |
| Receive | SystemBuffer |
| Send | SystemBuffer |

FIG. 4B

| | Throughput | Probability | Relative Performance | Relationship Update | MTU | TCPWindowSizeREAD | TCPWindowSizeWRITE | RFC1323 | Receive | Send | Max Simultaneous Connection | Max Simultaneous Connection1_0 |
|---|---|---|---|---|---|---|---|---|---|---|---|---|
| 502 | 65 | 0 | 0.5 | | 576 | 65535 | 65535 | | 0 N/A | N/A | 4 | 4 |
| 503 | 20 | 0 | 0.4 | | 576 | 87238 | 87238 | | 0 87238 | 87238 | 4 | 4 |
| 504 | 85 | 1 | 0.6 | | 1500 | 87238 | 87238 | | 0 87238 | 87238 | 4 | 4 |
| 505 | 95 | 1 | 0.6 | 7 Unrelated to 1,2,3,4,5,6,8 | 1500 | 121000 | 121000 | | 0 121000 | 121000 | 4 | 4 |
| 506 | 95 | 1 | 0.6 | 8 Unrelated to 1,2,3,4,5,6,7 | 1500 | 121000 | 121000 | | 0 121000 | 121000 | 8 | 4 |
| 507 | 95 | 1 | 0.6 | 1,2,3,4,5,6 | 1500 | 121000 | 121000 | | 0 121000 | 121000 | 4 | 8 |

FIG. 5A

| ID | Device Parameter (Type) | Relationship | Relationship Type |
|---|---|---|---|
| 1 | MTU | 2,3,4,5,6 | Known Related |
| 2 | TCPWindowSizeREAD | 1,3,4,5,6 | Known Related |
| 3 | TCPWindowSizeWRITE | 1,2,4,5,6 | Known Related |
| 4 | RFC1323 | 1,2,3,5,6 | Known Related |
| 5 | Receive | 1,2,3,4,6 | Known Related |
| 6 | Send | 1,2,3,4,5 | Known Related |
| 7 | Max Simultaneous Connections | 1,2,3,4,5,6 | Unknown |
| 8 | Max Simultaneous Connections1_0 | 1,2,3,4,5,6 | Unknown |

FIG. 5B

SYSTEMS AND METHODS FOR TUNING AN OPERATING SYSTEM, APPLICATION, OR NETWORK COMPONENT

RELATED PATENTS

This application claims the benefit of Provisional Patent Application No. 61/075,618 filed Jun. 25, 2008 entitled "SYSTEMS AND METHODS FOR TUNING AN OPERATING SYSTEM, APPLICATION, OR NETWORK COMPONENT" which is incorporated herein by reference.

TECHNICAL FIELD

This invention relates to tuning a device, including operating systems, applications, and network components, and more specifically, but not exclusively to tuning based on constraint-searching of device parameters

BACKGROUND OF THE INVENTION

Computing devices often have a variety of different configurations and settings that require proper tuning and monitoring to ensure that the devices perform optimally. However, in an enterprise, the number of devices, applications, configurations, and settings may overwhelm the abilities of an administrator. Adding to this complexity, performance may also be based on the interrelationships between components within a device. Moreover, in a computer networking environment, performance of the devices may be based on the interrelationships between the networked components. Automated monitoring tools may provide some insight into trouble spots and possible optimizations. Possible manual optimizations may involve using rules to determine parameter tuning based on network conditions. However, manual optimization remains problematic. In particular, a system becomes chaotic over time and may produce different results from initially identical conditions. It is with regards to this issue and others that the present invention is directed.

SUMMARY

Generally, the present invention relates to a processor-implemented method for tuning a computing device. In one embodiment, the method may include storing values for each of a plurality of device parameters based on device metrics; constraint-searching over changes settings to the device parameters to identify at least one point within each range of the device parameters that optimizes an improvement function of a performance measure for the device; selecting tuning values for each device parameter based on the identified point; and providing the tuning values for tuning the device.

In a preferred embodiment, constraint-searching includes modifying, on the device, each device parameters within a subset of the device parameters; in response to modifying, calculating the performance measure of the device; and recursively performing the steps of modifying and calculating until the improvement function of the performance measure is determined to reach an optimal point. The optimal point may comprise a local minimum or maximum, a global minimum or maximum for a number of iterations of the recursive performance of the steps of modifying and calculating, or the like.

In one embodiment, the method may include determining a relationship between first device parameter and a second device parameter based on whether changing the first and second device parameters relative to each other changes the calculated performance measure. In yet another embodiment, the method may include, in response to determining whether the relationship, further constraint-searching based on the determined relationship, wherein the device parameters within the subset are related to each other by the determined relationship of related or unknown.

In a preferred embodiment, the step of modifying, on the device, the each device parameters within the subset of the device parameters comprises setting the device parameters that are within the subset, wherein these device parameters are related to each other or are unknown to be related to each other, while keeping a device parameter outside the subset constant. The step of modifying, on the device, the each device parameters within the subset of the device parameters may also comprise performing on the device parameters within the subset at least one of: a binary search; a random walk; a simulated annealing; a gradient descent; a change based on a schedule; a min-max search; or the like.

In a preferred embodiment, the plurality of device parameters includes a different device parameter for a plurality of types for each of a plurality of services, wherein the plurality of types is representative of device configurations for performing for performing a system operation, the Transmission Control Protocol (TCP)/Internet Protocol (IP), or other networking within a plurality of Open Systems Interconnection (OSI) layers. In yet other embodiments, the services comprise a use of an application, a use of a type of application, a type of user, or system usage.

In one embodiment, the method may include filtering the metric based on a service related to the device parameter before storing the values for each of a plurality of device parameters.

In one embodiment, the method may include saving a state of the device; tuning the device based on the determined tuning values; and if a self-test on the device fails for at least one of the tuning values, rolling back to the saved state.

Another aspect of the invention is directed to a system for tuning at least one device over a network. In one embodiment, the system includes a server configured to perform actions comprising: storing tuning values for each of a plurality of device parameters and for each service of the device based on device metrics; constraint-searching over changes to settings of the device parameters to identify a point within each range of the device parameters, wherein the identified point optimizes a performance measure for the device; and providing tuning values for each device parameter based on the identified point. The system may also include another device configured to perform actions comprising: self-tuning based on the provided tuning values; and rolling-back to a saved state for at least one of the tuning values if a self-test for the at least one tuning values fails.

In one embodiment, constraint-searching may comprise performing an intersection of points for each of the ranges of the device parameters and for each service, performing a statistical analysis of changes in the device parameters, or the like.

In yet another embodiment, actions of the other device further comprises generating information usable to determine a metric of the other device; and sending the metric to the server for generating the points within the ranges.

In a preferred embodiment, an administrator interface configured to perform actions comprising: receiving a tuning policy usable in constraining the provided tuning values to satisfy the tuning policy.

Another aspect of the invention is directed to a network device for tuning another device over a network, including a processor configured to perform actions comprising storing values for each of a plurality of device parameters and for each service of the other device based on device metrics; constraint-searching over changes to settings of the device parameters to identify a point within each range of the device parameters, wherein the identified point optimizes a performance measure for the other device; and providing tuning values for each device parameter based on the identified point. The performance measure may comprise at least one of CPU usage, GPU (Graphical Processing Unit) usage, memory usage, input/output usage, network usage, or the like.

In a preferred embodiment, the actions further comprise receiving a tuning policy; and ensuring that the determined tuning values satisfies the tuning policy. The actions may further comprise receiving, from an agent on the device, a plurality of test messages over the network; gathering a plurality of network metrics, based on the received plurality of test messages; receiving a system metric based on a performance of the device; and combining the plurality of gathered network metrics and the received system metric into the device metrics.

Another aspect of the invention is directed to an apparatus for self-tuning. The apparatus may include a processor for performing actions comprising: generating information about the apparatus usable to determine a metric of the apparatus; providing the metric for generating a range of constraint-matched values for a device parameter and a service of the device based on the determined metric; receiving at least one tuning values for the device parameter based on the constraint-matched values; and self-tuning the apparatus based on the received tuning value. In a preferred embodiment, at least one of the device parameters comprise a network parameter for an interface for communicating over the network, an operating system parameter of an operating system operating on the apparatus, a registry setting, a group policy object, or a configuration file.

Yet another aspect of the invention is processor-readable medium comprising instructions that when executed by a processor causes the processor to perform actions. The actions may include determining a value for a device parameter and a service of the device based on a device metric and a filtering policy; constraint-searching over changes to settings of the device parameter to identify a point within a range of the device parameter, wherein the identified point optimizes a performance measure for the device; selecting a tuning value the device parameter based on the identified point; and providing the tuning value for tuning the device.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 4A shows an example of a table for mapping device parameters to device and operating system specific configurations;

FIG. 4B shows an example of a table for mapping a device parameter to a service;

FIG. 5A shows an example of a table for processing different constraint-searching results;

FIG. 5B shows an example of a table for processing determined relationships between parameters.

DETAILED DESCRIPTION

As used herein, the term "client" and "server" refers to computing devices that perform the roles of receiving a service (client) or providing a service (server), but the terms do not limit the roles of the devices. For example, a client may also be a server and vice-versa. Moreover, in some embodiments, the devices may be configured in a peer-to-peer fashion, a load-balanced fashion (e.g., multiple servers providing load-balanced services), or the like. As used herein, the term "parameter" refers to configuration of a computing device that is modifiable either through hardware or software, wherein the setting of the configuration affects the performance of the device. As used herein, the phrase "setting a parameter" refers to setting the value for the parameter.

As used herein, the term "point" refers to an ordered collection of information (e.g., <X, Y, Z>), wherein each of the information in the collection represents a value within a range of values. The information may be, but need not be numeric.

As used herein, the terms "local minimum" or "local maximum" refers to an inflection point within a function within a particular dimension. The function may be an implicit function (e.g., a function determined by empirical measure and that may not be known). As used herein, the terms "global minimum" or "local maximum" refers to a highest or lowest point of a function over a range.

As used herein, the term "metric" refers to any measurable data for a particular type of data.

FIGS. 1A-1B, 2, and 3 show processes for tuning a device. In some embodiments, the processes may be performed over a network, but in other embodiments, the processes may be performed on a single device. The tuning may be performed on devices in an enterprise, on a single network, on devices sitting in different networks, or the like. In another embodiment, the tuning may be performed by a service provider providing the tuning service to a user device that downloads appropriate tuning software. While particular steps are shown, more or fewer steps may be performed without departing from the scope of the invention. In some embodiments, certain steps may be optional. In one embodiment, the processes may be performed on the devices of FIGS. 6A-6B.

Figure 1A:
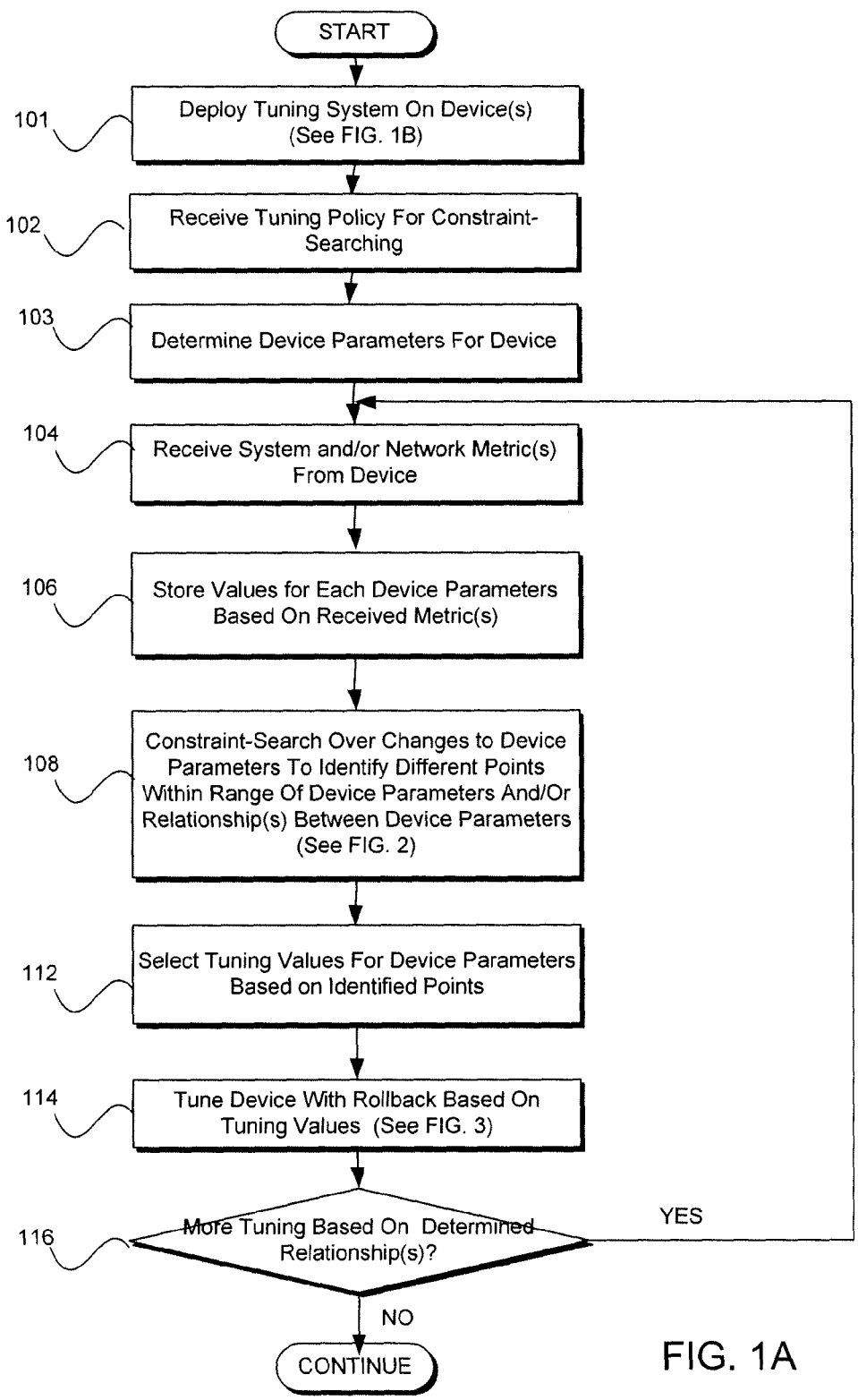
FIG. 1A shows an example of a process for tuning a device.

FIG. 1A shows an example of a process for tuning a device. The process of FIG. 1A begins at step 101 where a tuning service is deployed on at least one device. In one embodiment, the process of step 101 may be performed by, for example, the process of FIG. 1B. Briefly, tuning agents may be installed, configured, and validated on at least one client device. Monitoring and tuning managers may be installed, configured, and validated on at least another device. In one embodiment, the tuning agents and monitoring and tuning managers may be installed on the same device. In one embodiment, step 101 may be optional and may not be performed. In some embodiments, devices may be pre-installed with tuning services.

At step 102, a tuning policy for defining a constraint-searching of device parameters is received. In one embodiment, the tuning policy may be received from an administrative component. In one embodiment, the tuning policy may comprise constraints of the type of processed device parameters, services, performance measures, an improvement function for a particular type of performance measure, a function to determine whether a performance measure or improvement function has reached an optimal point, or the like. The tuning policy may be configured as processor executable instructions or data structures, such as the tables of FIGS. 4A-4B and 5B. In one embodiment, the tuning policy constrains the type of tuning and optimization performed by the processes described herein. In one embodiment, the tuning policy constrains the tuning and optimization to particular combinations of Services, operating systems, platforms, performance property of a device, or the like. This tuning policy may represent a desire for a device or system to be tuned or optimized for a particular configuration or use. For example, the tuning policy may constrain tuning to combinations of (CPU for mySQL), (CPU for Graphical Artists), (Network Operations for Windows), (Cache Size for Email Programs and for Administrators), or the like.

In yet another example, an administrator may desire to tune a system or device to perform well for another type of use and a type of user. For example, the administrator may specify the tuning policy to tune a workstation on an enterprise to perform well for (Lawyers using Microsoft Word and Outlook) as well as for (Database Administrators using Database tools). In another example, the administrator may tune a mobile device to perform well for (Networking Operations and the Safari Browser) as well as for (Excel and Salespeople). As can be seen, the performance for a device may be multi-dimensional.

At step 103, at least one device parameter for a client device is determined. In one embodiment, an agent may examine a system configuration, registry, or the like, and may determine whether the configuration matches a parameter type. In one embodiment, the parameter type may be preconfigured, configured by a tuning policy, determined automatically by clustering device behavior and configuration settings, or the like. In one embodiment, the determination may be performed on the device (e.g., by the agent), on a server device in communication with the device, or the like.

At step 104, a system and/or network metric is received from the device. In one embodiment, the metric is received over a network, through an interface such as an Application Programming Interface (API), through a web service, or the like. In one embodiment, the metric may be polled, pushed, or pulled from the client device, based on a schedule, a determined frequency, or the like. The system and/or network metric may be further processed, filtered, categorized, combined, or the like, into other metric(s), using, for example, filters, clustering, an expert system, or the like. In one embodiment, the modified/combined device metric may be used in subsequent processing. In one embodiment, device parameters may be represented by each row of FIG. 4A.

At step 106, values for each determined device parameter may be retrieved, calculated, and/or stored based on the received metric. In one embodiment, the device parameter values may simply be the received metric. In another embodiment, further calculations, filtering, and/or monitoring may be performed to calculate the device parameter value. In one embodiment, the metric may be filtered based on the Services 426 specified for the device parameters. For example, for services related to Financial Users, the metric related to Financial Users (e.g., database usage, CPU usage, GPU usage, chip or processor usage usage) are filtered and selected and converted into device parameters.

In other embodiments, further processing based on the Device Parameter Type is performed to determine the device parameters. For example, an agent on a device may send a first metric, such as a send time of a message to a server device. The server device may receive the message and may calculate the latency based on the send time and the time of receipt of the message and may store the calculated value as the device parameter value. In one embodiment, a plurality or a range of values may be retrieved, calculated, and/or stored for a particular device parameter and/or for a combination of device parameters.

At step 108, constraint-searching is performed over at least one change of the values of the device parameter(s) to, among other things, identify a point or different points within the range of the device parameters and/or to identify the relationships between the device parameters. In one embodiment, the process of step 108 may be performed by the process of FIG. 2. Briefly, constraint-searching may comprise modifying, on the device, each device parameters within a subset of the device parameters, in response to modifying, calculating at least one performance measure of the device or an improvement function of the at least one performance measure, recursively performing the steps of modifying and calculating until the performance measure or a function thereof is determined to reach an optimal point, or the like. In one embodiment, constraint-searching may involve performing an intersection of points for each of the ranges of the device parameters for each service, performing a statistical analysis of changes in the values of the device parameters, modifying, on the device, the settings of at least some device parameters (and in some cases, not all the device parameters) and empirically measuring and calculating a performance measure, or the like. In one embodiment, the identified point may comprise the device parameters, a subset of the device parameters, a function of the device parameters, or the like.

At step 112, at least one tuning value for at least one device parameter may be selected based on the identified point(s). In one embodiment, the tuning values may be selected from the values within the identified point(s), may be based on a mapping between tuning values and the identified point(s), or the like. The selected tuning values may be provided for tuning the device. The tuning values may be provided over a network, for example, as an Extensible Markup Language (XML) file, a network message, or the like.

At step 114, the device is tuned with roll-back based on the selected tuning values. In one embodiment, the process of step 114 may be performed by the process of FIG. 3. Briefly, tuning with rollback may comprise saving a state of the device; tuning the device based on the determined tuning values; and if a self-test on the device fails for at least one of the tuning values, rolling back to the saved state.

At step 116, it is determined if more tuning should be performed. In one embodiment, further tuning may be configured, requested, or required by an administrator, and administrative module, a heuristic, a number of iterations, a schedule, or the like. In one embodiment, further tuning may be performed until the identified optimal point stabilizes (e.g., remains the same point, or within a range of the same point between iterations of the process of FIG. 1). In one embodiment, the further tuning is based on the relationship(s) between the device parameter(s) identified in step 108. In one embodiment, further execution of step 108 and/or step 202 of FIG. 2 (described below) may be based on the identified relationship(s). That is, further execution of constraint-searching will generate a possibly smaller subset for searching based on the previously determined relationship, thus constraining the combinatorial explosion of the number of possible changes to settings of device parameters. In any case, at step 116, if it is determined that more tuning should be performed, processing loops back to step 104. Otherwise, processing continues to other processing.

Figure 1B:
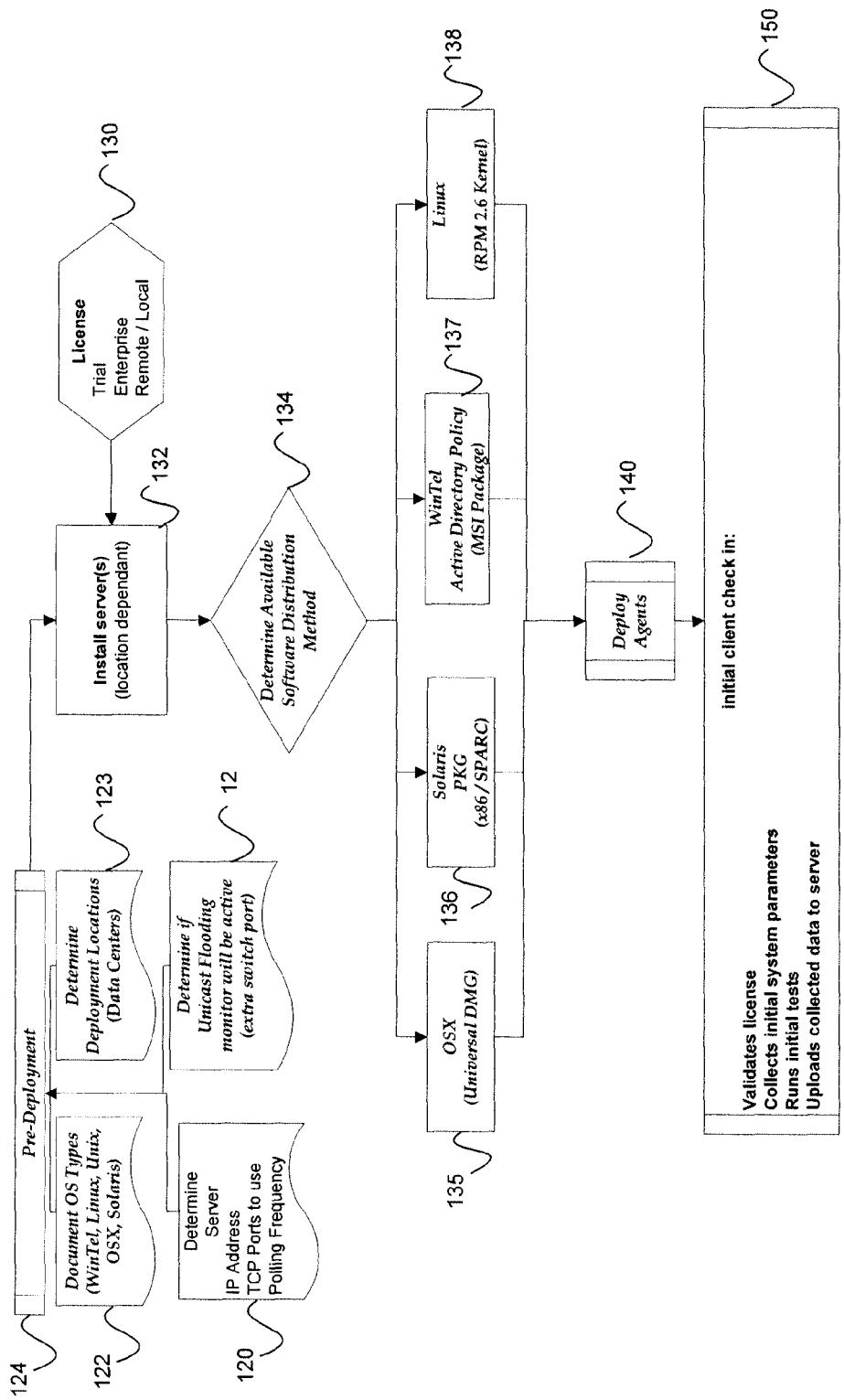
FIG. 1B shows an example of a process for deploying a tuning service.

FIG. 1B shows an example of a process for deploying a tuning service. The process of FIG. 1B begins at steps 120-123 where a plurality of information related to device is gathered. At step 120, an IP address and/or TCP ports of a server device to send a device metric and the polling frequency at which to send the metric to the server device are determined. At step 121, it is determined if unicast flood monitoring will be active (e.g., a particular type of networking process will be monitored by the server device to determine device metrics). At step 122, the operating system type and/or platform (e.g., hardware/mobile/non-mobile) is determined. At step 123, the location(s) of devices on which to deploy the tuning agents are determined. The information from steps 120-123 is provided to step 124, where the pre-deployment information is stored and/or combined.

At step 132, the pre-deployment information is used to install and/or configure tuning software on the server device(s). The license for the use of the tuning software may also be used to authorize the use of the software at step 130.

At step 134, the available software distribution method for a particular operating system or platform is determined. At steps 135-138, the particular operating systems and platforms are specifically determined (e.g., OSX is determined at step 135, Solaris at step 136, WinTel at step 137, Linux at step 138). The determined distribution method is used to deploy the agent(s) at step 140 on the determined client devices.

At step 150, the initial client check-in process begins. The process may comprise validating the license for the client device, collecting initial system parameters (e.g., used to build the table of FIGS. 4A-4B, 5A-5B), running initial tests (e.g., to see if any parameters fail self-tests), and uploading collected data to the server. In one embodiment, the process may be performed by an agent on the client device.

Figure 2:
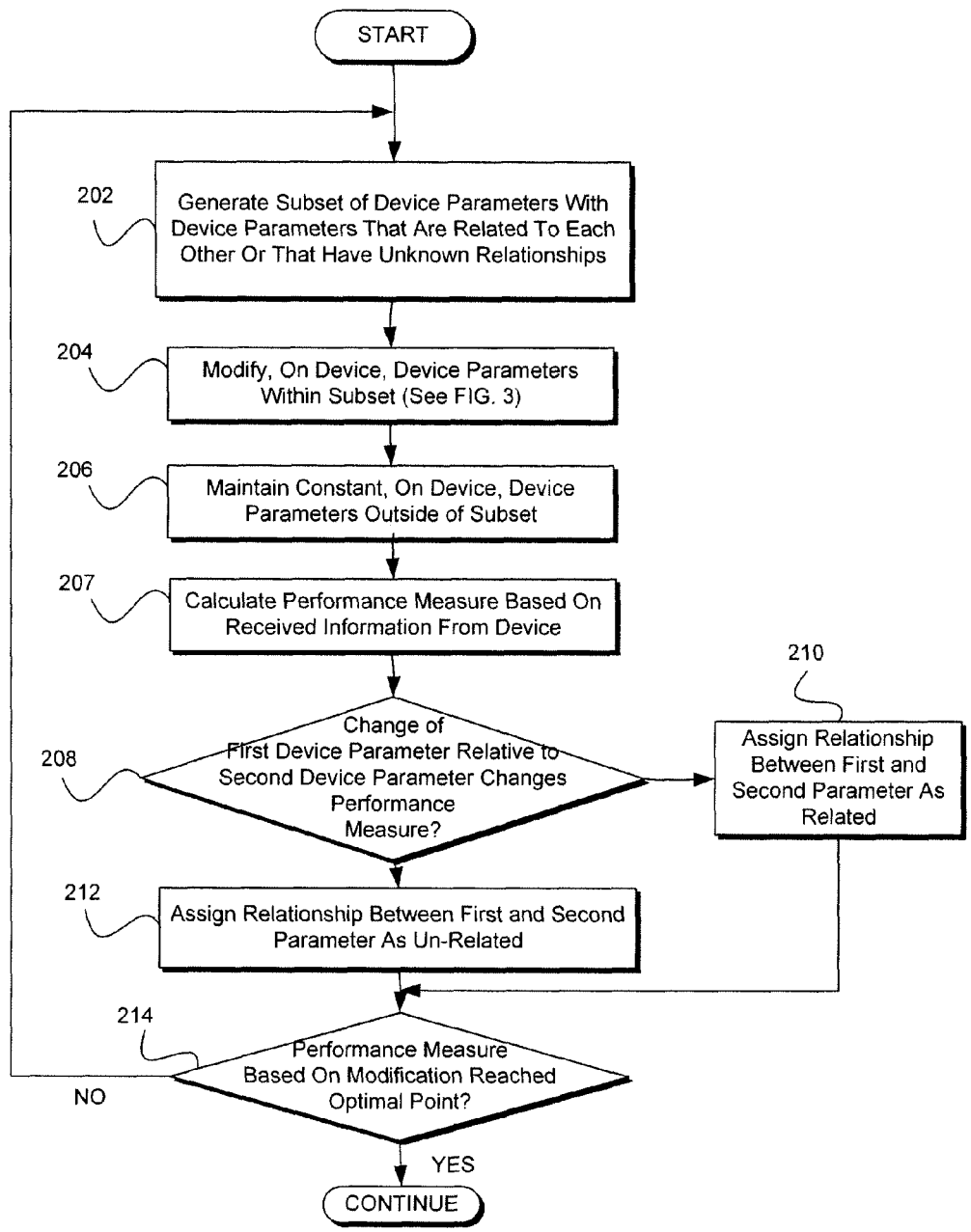
FIG. 2 shows an example of a process for constraint-searching over changes to settings of device parameters.

FIG. 2 shows an example of a process for constraint-searching over changes in the values to device parameters. The process begins at step 202 where a subset of the device parameters may be generated, wherein the subset includes device parameters that are determined to be related to each other, or that have an unknown relationship to each other. In one embodiment, the subset may include not all of the device parameters. In one embodiment, generating the subset may comprise selecting a seed device parameter, and finding one or more other device parameters related to the seed device parameter, or finding device parameters with an unknown relationship to the seed device parameter. In one embodiment, selecting the seed may be random, may be based on a heuristic, a schedule, or the like. The relationship between the device parameters may be stored and/or retrieved from a table, such as the table of FIG. 5B.

At step 204, the value settings for the device parameters within the subset are modified on the device. In one embodiment, the modification of a particular device parameter may be constrained by a Value Range 424 of possible values, a range of desired values, a range of pre-configured values by, for example, and administrator, or the like. In one embodiment, modifying the device parameters may include setting the value within a particular location (e.g., as shown in the Location 425 column of the table of FIG. 4A), or the like.

Figure 3:
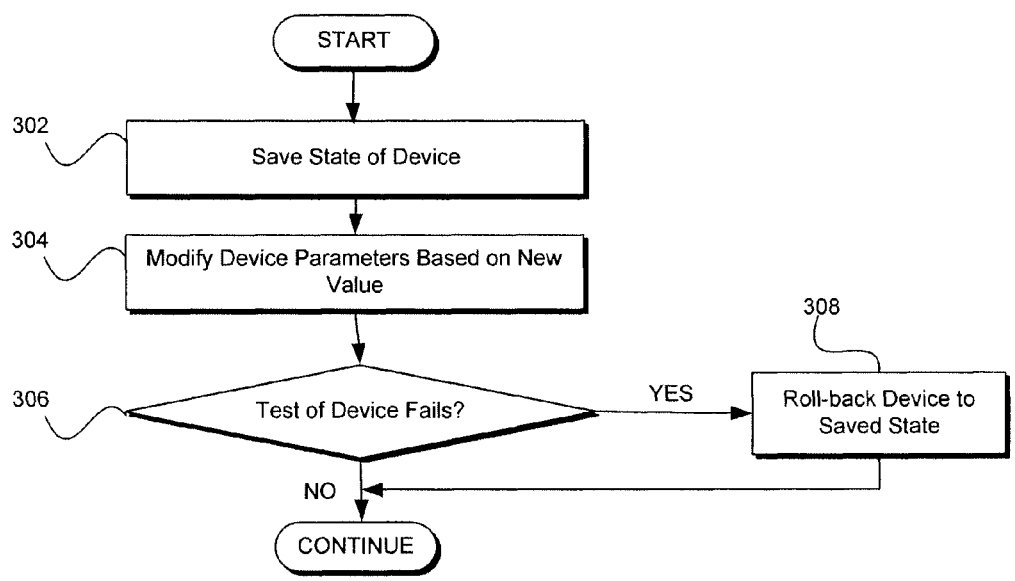
FIG. 3 shows an example of a process for tuning with roll-back of a device.

In another embodiment, the device parameters' settings may be set with a fail-safe rollback as described in FIG. 3. In one embodiment, each parameter may be set individually, while in another embodiment, some or all of the device parameters may be set at once. In one embodiment, if setting a particular device parameter to a particular value fails, the device parameter's range may be modified to exclude the problematic value. In another embodiment, failure may cause the device parameter to be removed from the subset, removed from further use as a device parameter within the process of FIGS. 1 and/or 2, or the like. In one embodiment, modifying, on the device, the each device parameters within the subset of the device parameters comprises performing on the device parameters within the subset at least one of: a binary search; a random walk; a simulated annealing; a gradient descent; a change based on a schedule; a min-max search; and A* or heuristic search, or the like.

At step 206, the settings of the device parameters that are outside the subset may be maintained constant on the device. In one embodiment, no action may be needed, or a no-op operation may be performed. In another embodiment, the maintained value setting may be set on the device within the particular device parameter's location.

At step 207, at least one performance measure is calculated based on received information (empirical results) from the device. Thereby, the device parameters in the subset is tested on the device to provide the empirical results. In one embodiment, the performance measure comprises at least one of CPU/GPU usage, memory usage, input/output usage, network usage, or the like. As shown in FIG. 5A, the performance measure of Throughput 520 may be calculated based on received networking information. In one embodiment, an improvement function of the performance measure, such as a Relative Performance 520 (as shown in FIG. 5A) may also be calculated. In one embodiment, the function may be representative of an improvement in the performance measure.

At step 208, it is determined if a first change of a first device parameter relative to a second device parameter correlates with a second change in a performance measure. If it is determined that the first change correlates with the second change, processing continues to step 210. Otherwise, processing continues to step 212.

At step 210, the relationship between the first device parameter and the second device parameter is set to be "related." Referring to table FIG. 5A row 503, the performance measure changes from 65 (from row 502) to 20 for a relative change between MTU and TCPWindowSizeREAD (e.g., TCPWindowSizeREAD changes from 65535 to 87238). For this example, it may be determined that MTU and TCPWindowSizeREAD are related. The "related" relationship between the device parameters may be stored, updated, or corrected in a field such as Relationship Update 523 or a table, such as the table of FIG. 5B.

At step 212, the relationship between the first device parameter and the second device parameter is set to be "un-related." Referring to the table of FIG. 5A row 506, the performance measure (95) does not change between changes of first device parameter Max Simultaneous Connection (ID=7) and any of the other parameters. Thus, it is determined that device parameter 7 is unrelated to device parameters 1, 2, 3, 4, 5, 6, 8. In row 507, the performance measure (95) does not change between changes to settings of the first device parameter Max Simultaneous Connection 1_0 and any of the other parameters. Thus, the device parameter 8 is determined to be unrelated to device parameters 1, 2, 3, 4, 5, 6, 7. The "un-related" relationship between the device parameters may be stored, updated, or corrected in a field such as Relationship Update 523 or a table, such as the table of FIG. 5B.

At step 214, it is determined if the performance measure and/or the improvement function of the performance measure for the device is optimized based on the updated values of the device parameters. In one embodiment, the performance measure/function is optimized when the performance measure/function reaches an optimal point. In one embodiment, the optimal point comprises a local minimum or maximum, or a global minimum or maximum for a number of iterations of the recursive performance of the step of modifying and calculating, or the like. Referring to FIG. 5A, in one embodiment, a Probability 521 is calculated to determine the likelihood that the performance measure or function has reached an optimal point. As shown, at row 503, the Probability 521 is measured to be 0.0 which represents the likelihood of the information at that row representing a an optimal point is 0%. At row 504, the Probability 521 is measured to be 1.0 which represents the likelihood of the information at that row representing a an optimal point is 100%. In one embodiment, the Probability 521 may be determined to be 1.0 if the current values of Relative Performance 522 (e.g., 0.6) is the current local maximum. In other embodiments, Probability 521 may be measured by historical information such as conditional probabilities of changes to the performance measures, heuristics, or any other function that increases/decreases as the likelihood of an optimal point increases/decreases.

In one embodiment, the current local maximum may be a local optimal (minimum or maximum) point. In an alternate embodiment, an optimal calculation (e.g., Probability 521) may be performed for each of the different types of performance measures (or improvement function thereof) such as a measure for CPU/GPU, Memory, Input/Output (e.g., Hard Disk Access), Network Operations, or the like. In performing the process of FIG. 2, the result of the optimal calculations may yield a plurality of indications that a current iteration represents the overall optimal. In one embodiment, a weighted sum or other function may be calculated to bias one or more of the associated results of the optimal calculations. For example, a tuning policy may specify that for an iteration, a performance measure may be determined for a CPU for use with the Internet Explorer Application (Service is IE), another performance measure may be determined for Network Operations and a type of Accountant users (Service=Accountant User). The tuning policy may also specify that the performance measure for CPU-IE should be weighed more heavily (e.g., 0.8) and the performance measure for Network Operations-Accountant should be weighted less heavily (e.g., 0.2). In this example, the Probability 521, the tuning policy may specify a desire for the tuning to be biased towards performance for good CPU usage for IE and good networking performance for uses associated with Accountants. As another example a tuning policy may specify Probability 521=(0.2*Probability (CPU)+0.6*Probability (Memory)+ 0.1*Probability (Input/Output)+0.1*Probability (Network Operations)). In this example, Memory and CPU are biased more than the other measures. In general, the probability measures may be based on functions of any combinations of services and performance property of a device. Any weights may also be used for any combinations of performance measures.

In any case, if the performance measure/function is not optimized or otherwise non-optimized, processing continues to step 202. Subsequent iterations of the process of FIG. 2 is performed based on updated relationships between device parameters and updated relative performance measures. As can be seen, the system self-corrects for errors in these and other values.

If, at step 214, the performance measure/function is not optimized or otherwise non-optimized, processing continues to step 202 processing returns to other processing. In one embodiment, the identified device parameter point(s) that are related to measure/function's optimal point are provided to step 112 of FIG. 1 for further processing.

FIG. 3 shows an example of a process for tuning with roll-back of a device. The process begins at step 302, where a state of the device is saved. In one embodiment, the parameters, configurations settings, or the like, of the device are saved, for example, in a state file, within a memory device, a storage medium, or the like.

At step 304, at least one setting of one device parameter may be modified on the device. In one embodiment, the device parameter's location may be retrieved for the particular device parameter from a table such as the table of FIG. 4A. In one embodiment, at least one parameter is changed at a time.

At step 306, a test of the device is determined to fail. In one embodiment, the test may be performed by the device (e.g., a self-test). In one embodiment, the test may be to determine if a performance of the device satisfies at least some or all pre-determined values or settings, or the like. If the test is determined to fail, processing continues to step 308, wherein the device parameter's setting are reset to the saved state. Otherwise, processing continues to other processing.

In an alternate embodiment, at least some subset of device parameters may be tuned by a rules based system while another subset(s) of device parameters may be tuned using the processes of FIGS. 1A-1B, 2-3. Briefly, a rule-based system may receive a plurality of device parameter values. The rule-based system may be a decision tree, an expert system, or the like. Based on logic and at least one comparison of the device parameter value as inputs to threshold values (pre-configured or adaptable), a rule fires and causes an action to occur. The action may be to cause other rules to fire and/or to indicate that at least one device parameter on the device should to be set/configured to a particular value. The particular value may be a function of the device parameter value input. In one embodiment, the device parameter value inputs may be gathered by a network diagnostic tool such as the University of Chicago's Web 100 Network Diagnostic Tool (NDT), however any type of system or network measuring component may be used.

In one embodiment, rule-based system's indications or suggestions for device parameters and their settings or configurations may be combined with the constraint-searching's settings of the identified device parameter point(s) associated with an optimal point. In one embodiment, the subset of device parameters managed by the rule-based system and the subset managed by the constraint-searching may not overlap. In this case, the device parameters may be set according to their respective settings. In another embodiment, the subset may overlap. In this case, the overlapping parameters' settings may be combined, for example, using either the constraint-searching or the rule-based systems' parameters as the overriding settings, combining the settings using an average, a weighted average, or the like. The weighted average may be based on the Probability 521 for the optimal point as at least a portion of the weight for a parameter's setting and/or other weights, such as certainty factors, for the weights of another parameter's setting.

FIGS. 4A-4B, 5A-5B represents examples of particular embodiments of data structures usable by the processes and systems described herein. Other fields and data structures, such as B-trees, XML files, text files, or the like may used without departing form the scope of the invention. The data structures may be embodied in memory such as memory 608 of FIG. 6.

FIG. 4A shows an example of a table for mapping device parameters to device and operating system, and/or platform specific configurations. In one embodiment, the operating system may include Windows, Linux, SunOS, Symbian, Palm OS, Android, or the like. In one embodiment, the platform may be hardware specific and/or may specify the device type (e.g., mobile/non-mobile, embedded device, networking device, workstation). As shown in FIG. 4A, device parameter rows 402 of a particular Device Parameter Type 421 (e.g., MTU, RFC 1323, Receive, Send, TCPWindowSize READ and Write, Maximum Simultaneous Connection(s), Selective Acknowledgements, Timeout values, Retransmit values, etc.) may have a particular value of a Value Type 422. The Value Type 422 may be device or operating specific and/or may be a generic data type (e.g., text, float, int). Each device parameter may be specific to a particular Operating System (OS) 423 and may be known or may be desired to be constrained within a Value Range 422. Each device parameter may be stored and/or modified within a particular configuration Location 425. The Location 425 may be a physical location on a memory device, for example, or may be a logical location modifiable using, for example, operating system calls, such as a registry call, or the like. As such, the device parameter rows 402 define the constraints on the use of the device parameters by the processes and systems described herein. For example, the Value Range 422 defines the constraint-searching range. A binary-search may divide the Value Range 422 in half and use the boundaries of the ranges as a particular candidate device parameter, and recursively divide that range in half to find an optimal device parameter. The binary-search may also modify the values based on the Value Type 422. For example, a floating point number may be divided in half, but a number on a logarithmic scale may use an non-linear division function.

As shown in FIG. 4B, the rows 404 of particular device parameters of particular Device Parameter Types 421 may be related to a plurality of Services 426 (e.g., TCP, Internet Explorer, Citrix, SystemBuffer, etc.). The Services 426, and relationships between device parameter (types) and Services 426 may be pre-configured, configured by a tuning policy, determined automatically by clustering device behavior and configuration settings, or the like. In one embodiment, the Services 426 may be directed to improving performance for an application (e.g., Internet Explorer, MySQL) or application type (e.g., Web Browser, Database), directed to improving performance for a type of user (e.g., Power User, Financial User, Developer), directed to improving networking performance (e.g., TCP, Hyper Text Transfer Protocol (HTTP)), directed to improving general system performance (e.g., System Buffer, CPU usage, memory usage, input/output activity), or the like. Using the tables of FIGS. 4A and 4B, a mapping between a particular device parameter represented by rows from FIG. 4A a service may be determined.

FIG. 5A shows an example of a table for processing different constraint-searching results. As shown, each row 502-507 of the table represents one iteration of a process for constraint-searching over changes to device parameters, such as the process of FIG. 2.

As shown, each iteration row 502-507 may include a plurality of values of device parameters, e.g., MTU 524, TCP-WindowSizeREAD 525, TCPWindowSizeWRITE 526, RFC1323 527, Receive 528, Send 529, Max Simultaneous Connection 530, Max Simultaneous Connection 1_0 531, or the like. The values may be gathered initially when the values are sent from an agent on a device. In one embodiment, an initial testing may be performed on the device to create a baseline of performance characteristics. The baseline may be set as the first row of the table of FIG. 5a. The values may also be set for each iteration of the constraint-searching process, thereby testing the space embodied by the ranges of device parameters. The data set of the values may form a point within the ranges of the device parameters.

In one embodiment, a performance value, such as Throughput 520, is determined based on information received from the device in response to setting the device parameters on the device. In one embodiment, the information received may include measured values. The performance value may be received directly from the device or may be calculated based on information received from the device.

As shown, the Relative Performance 520 may be initially set at an initial value such as 0.5. In one embodiment, the Relative Performance 520, for subsequent iteration, is calculated based on whether the current performance measure improves over the previous performance measure. In one embodiment, the Relative Performance 520 may be increased by an increment (e.g., 0.1) if the performance measure improves. In one embodiment, the improvement of the performance measure may be specific to the type of the performance measure. For example, Throughput 520 improves if the value of the Throughput 520 increases. In one embodiment, there may be a plurality of performance measures, and the Relative Performance 520 measure may be increased if at least some or all of the performance measures improve. For example, the performance measures may be Throughput 520 and CPU time (not shown in FIG. 5A). The Relative Performance 520 measure increases if Throughput 520 increases and CPU time decreases.

FIG. 5B shows an example of a table for processing determined relationships between parameters. As shown in FIG. 5B, each row 508 of device parameter types may be identified by an ID 540. A Relationship Type 542 between the Device Parameter Type 421 and other device parameter types (stored in column Relationship 541) may be determined as: Known Related, Known Un-related, or Unknown. The relationships of FIG. 4B accordingly constrain the relationships between particular device parameters, such as those shown in FIG. 4A.

Figure 6A:
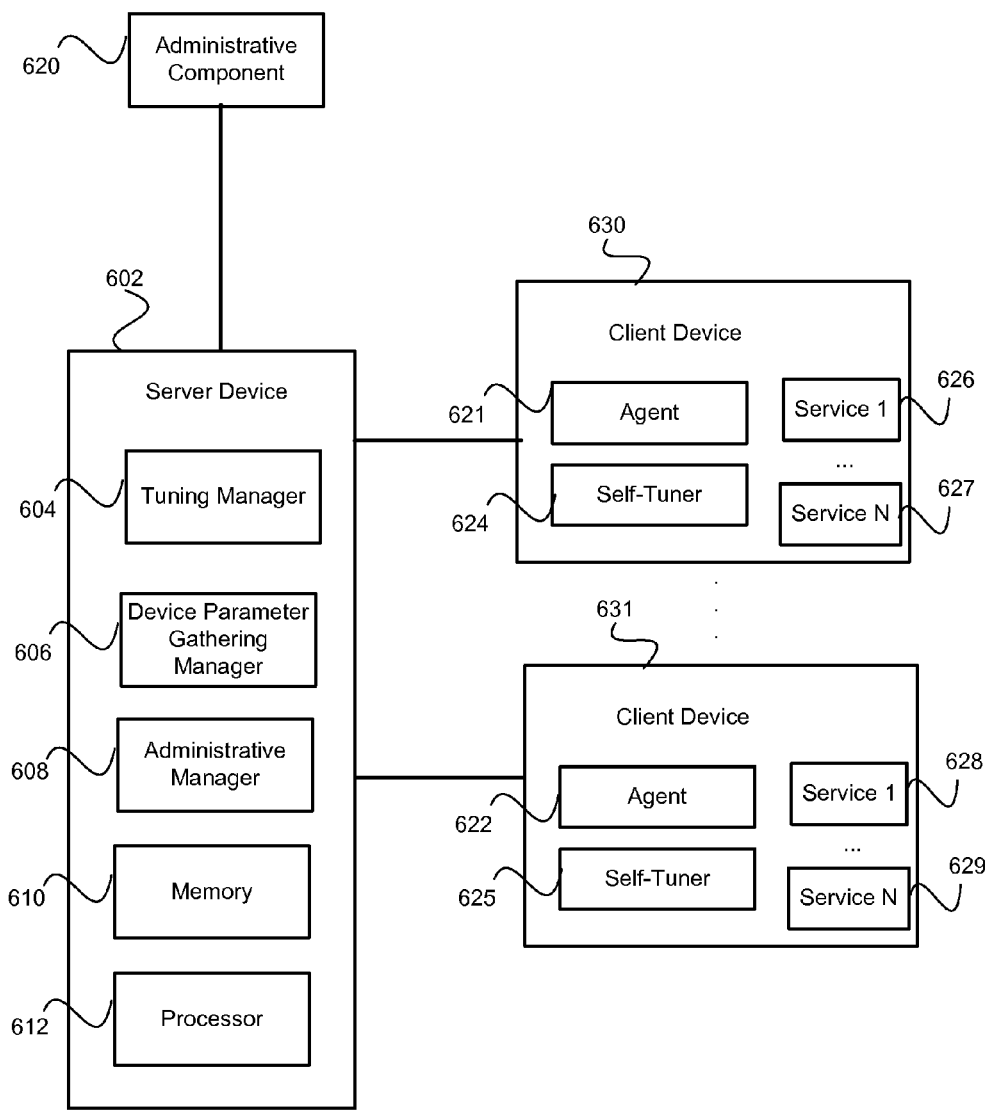
FIGS. 6A-6B show examples of systems and apparatuses for tuning a device.
Figure 6B:
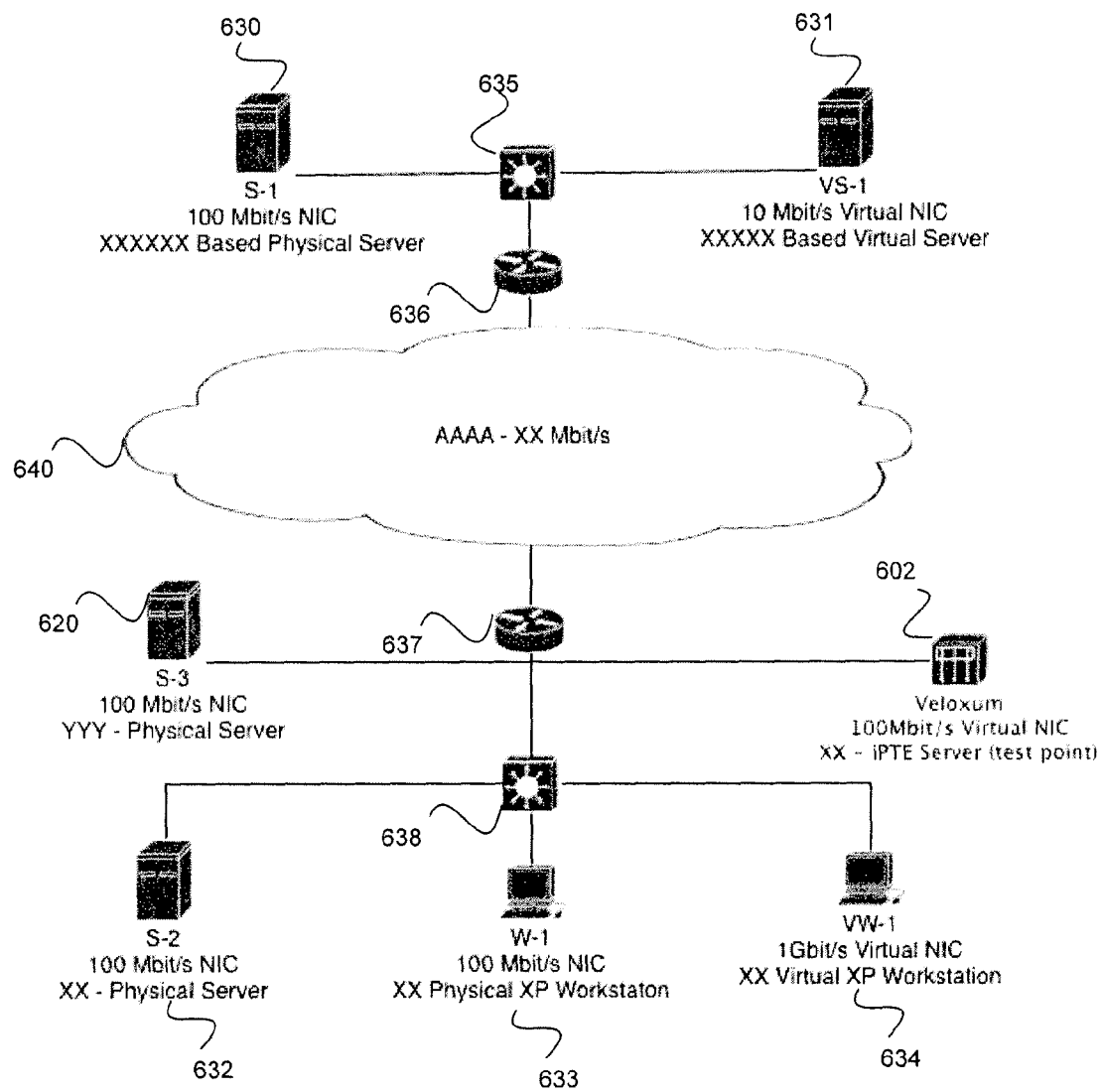

FIGS. 6A-6B show examples of systems and apparatuses for tuning a device. While particular components and/or interconnections are shown, other components and/or interconnections may be used without departing the scope of the invention.

As shown, the systems of FIGS. 6A-6B include administrative component 620, server device 602, client devices 630-634. The devices of the system may be in communication with each other over at least one network, such as network 640. The system may also include network devices 635-638 for managing network traffic such as routers, firewalls, or the like. The networks may be a wired or wireless network, a Local Area Network (LAN), Wide Area Network (WAN), or the like.

The devices of the system of FIGS. 6A-6B may be implemented in hardware, software, or the like. In one embodiment, the device may be at least one physical device, may be mapped as a virtual device across several devices or on one device (e.g., virtual server 631), or the like. In one embodiment, the client device may be an enterprise server, a database server, a workstation, or the like. In one embodiment, the devices may be mobile devices.

As shown, the client devices 630-634 may be in communication with server device 602 over a network. In other embodiments, the components of client and server may be combined in one device. In one embodiment, at least some client devices 630-631 may be in a different sub-net than server device 602.

In one embodiment, an agent may be deployed on at least one of the devices 630-638, using for example, the process of FIG. 1B. In one embodiment, the agent, such as agents 621-622, may be a software component sent from server device 602 to at least one of client devices 630-634 over a network.

In one embodiment, server device 602 may include tuning manager 604, device parameter gathering manager 606, administrative manager 608, memory 610, and processor 612. The components may be software and/or hardware components and may be in communication with each other. Other components may be included without departing from the scope of the invention. In one embodiment, server device 602 may perform the processes of FIGS. 1A-1B, 2, and 3. In one embodiment, device parameter gathering manager 606 receives and/or determines device parameters based on received device metrics from devices 630-638.

In one embodiment, tuning manager 604 may be configured to perform constraint-searching over changes to settings of device parameters. In one embodiment, tuning manager 604 may include a logic and database of remedial actions that it can intelligently apply. Tuning manager 604 may establish test points to test the device's parameters. Example of test points include rules such as: based on X and Y Network/System tests, request agents 621-622 to perform Z actions. Tuning manager 604 and/or agents 621-622 may use a decision tree stored for performing such tests. The Z actions may include further sending data to the server for determining network and system metrics. X, Y tests may be based on registry settings, group policy object, user permissions, configuration files, or the like.

Tuning manager 604 may also specify a remedial action plan to be executed by agents 621-622 based on constraint-searching. The remedial action plan may include tuning with rollback based on tuning values, but may also comprise setting or sending alerts, turning on or off services including backup services, privacy protection services, network protection services, or the like. The remedial action plan may be selected based on the selected tuning values. In one embodiment, an expert system may select the remedial action plan based on the tuning values and/or other information, e.g., time, historical activities, permissions of users, or the like.

Device parameter gathering manager 606 may receive information from devices 630-638 over a network. Device parameter gathering manager 606 may include a polling mechanism to check for various device parameters. Device parameter gathering manager 606 may determine the services available on devices 630-638 based on the received information (services include database services, types of database services (Oracle, SQL Server), applications (accounting, graphics, internet usage, etc), or the like.

In one embodiment, administrative manager 608 may include an interface for managing the components of server 602. The communication between administrative manager 608 and server device 602 may be over a networking protocol such as HTTP, or the like. In one embodiment, administrative manager 608 comprises an administrator interface configured to perform actions comprising receiving a tuning policy usable in constraining the provided tuning values to satisfy the tuning policy. In one embodiment, the tuning policy may be a software code or a data structure such as tables of FIGS. 4A-4B and 5B. In one embodiment, the administrative manager 608 may be configured to receive a tuning policy; ensure that the determined tuning values satisfies the tuning policy, or the like. Administrative component 620 may communicate with server device 602 using administrative manger 608 to manage the tuning as described herein. In one embodiment, the types of device parameters, the constraint of ranges for the device parameters, an initial relationship between device parameters, or the like may be entered using administrative manager 608. In one embodiment, the policy configuration may be per service type, device parameter type, or the like. For example, the Value Range 422 for MTU for a first Service 426 may be a first range, while the Value Range 422 for MTU for a second Service 426 may be a second range. In this embodiment, constraint-searching is configured to search within the overlapping ranges of the first and second ranges.

Memory 610 may include any component for storing data, including the data of tables of FIGS. 4A-4B, and 5A-5B. Memory 610 includes disk drives, EEPROM, flash memory, RAM, ROM, secondary storage devices, Serial ATA, ATA, IDE, EIDE, SCSI, Fibre Channel attached SCSI, iSCSI, or the like. In one embodiment, memory 610 and/or other memory components may be configured to store processor executable instructions that when executed causes a processor, such as processor 612, to perform the processes of FIGS. 1A-1B, 2, and 3.

In one embodiment, devices 630-638 may include components such as agents 621-622, self-tuners 624-625, and services 626-629. The components may be software and/or hardware components and may be in communication with each other. In one embodiment, devices 630-638 may perform the processes of FIGS. 1A-1B, 2, and 3. Agents 621-622 may gather device parameters from devices 630-638. In one embodiment, agents 621-622 may collect information about the system, applications installed, what devices are talking to devices 630-638, communications protocols (TCP/IP), or the like. Agents 621-622 may send the gathered information to server 602 for further processing.

In one embodiment, agents 621-622 may act as an active test object. Agents 621-622 may communicate with server 602 over specific communications ports. Server 602 may send an instruction set based on which the agents reports. Agents 621-622 may perform the instruction set (e.g., perform Z action based on X/Y tests). In one embodiment, agents 621-622 acts as a meta processing layer. Agents 621-622 may also execute remedial action plans including setting the values of device parameters on devices 630-638.

The services 626-629 may be configured to perform a plurality of functions, including word processing, data processing, or the like. The services may be configured to perform an activity for a particular type of user. Self tuners 624-625 perform the process of FIG. 3 to change device parameters and/or roll-back the device's state if a self-test fails. In one embodiment, self-tuners 624-625 may be configured to optimize services 626-629.

The foregoing is merely illustrative of the principles of this invention and various modifications can be made by those skilled in the art without departing from the scope and spirit of the invention.

What is claimed is:

1. A processor-implemented method for tuning a device, comprising:
   storing, on a computer memory, values for each of a plurality of device parameters based on device metrics;
   constraint-searching, by a processor, over changes to settings of the device parameters to identify at least one point within each range of the device parameters that optimizes an improvement function of a performance measure for the device, wherein constraint-searching comprises: (a) modifying, on the device, each said device parameters within a subset of the device parameters; and (b) recursively performing the steps of modifying and calculating the performance measure until the improvement function of the performance measure is determined to reach an optimal point and after the optimal point stabilizes during the recursive constraint-searching;
   selecting tuning values for each said device parameter based on the identified point;
   providing the tuning values for tuning the device; and
   tuning the device based on the provided tuning values;

wherein the constraint-searching further comprises determining a relationship between first device parameter and a second device parameter based on whether changing the first and second device parameters relative to each other changes the calculated performance measure.

2. The method of claim 1, wherein the optimal point comprises a local minimum or maximum, or a global minimum or maximum for a number of iterations of the recursive performance of the step of modifying and calculating.

3. The method of claim 1, further comprising:
in response to determining whether the relationship, further constraint-searching based on the determined relationship, wherein the device parameters within the subset are related to each other by the determined relationship of related or unknown.

4. The method of claim 1, wherein modifying, on the device, each said device parameters within the subset of the device parameters comprises:
changing the device parameters that are within the subset, wherein these device parameters are related to each other or are unknown to be related to each other, while keeping a device parameter outside the subset constant.

5. The method of claim 1, wherein modifying, on the device, each said device parameters within the subset of the device parameters comprises performing on the device parameters within the subset at least one of:
a binary search;
a random walk;
a simulated annealing;
a gradient descent;
a change based on a schedule; or
a min-max search.

6. The method of claim 1, wherein the plurality of device parameters comprises a different device parameter for a plurality of types for each of a plurality of services, wherein the plurality of types is representative of device configurations for performing a system operation or networking within a plurality of Open Systems Interconnection (OSI) layers, and wherein the services comprise a use of an application, a use of a type of application, a type of user, or system usage.

7. The method of claim 1, further comprising:
filtering the metric based on a service related to the device parameter before storing the values for each of the plurality of device parameters.

8. The method of claim 1, further comprising:
saving a state of the device;
tuning the device based on the selected tuning values; and
if a self-test on the device fails for at least one of the tuning values, rolling back to the saved state.

9. A non-transitory system for tuning over a network, comprising: a server computer including memory configured to perform actions comprising:
storing tuning values for each of a plurality of device parameters and for each service of the device based on device metrics;
constraint-searching using a heuristic over changes to settings of the device parameters to identify a point within each range of the device parameters, wherein the constraint-searching calculates a performance measure for the device and the identified point optimizes the performance measure for the device; and
providing the tuning values for each said device parameter based on the identified point; and
another device configured to perform actions comprising:
self-tuning based on the provided tuning values; and
rolling-back to a saved state for at least one of the tuning values if a self-test for the at least one tuning values fails;
wherein the constraint-searching further comprises determining a relationship between a first device parameter and a second device parameter based on whether changing the first and second device parameters relative to each other changes the calculated performance measure.

10. The system of claim 9, wherein constraint-searching comprises:
performing an intersection of points for each of the ranges of the device parameters and for each said service.

11. The system of claim 9, wherein constraint-searching comprises:
performing a statistical analysis of changes in the device parameters.

12. The system of claim 9, wherein the actions of the other device further comprises:
generating information usable to determine a metric of the other device; and
sending the metric to the server for generating the points within the ranges.

13. The system of claim 9, further comprising:
an administrator interface configured to perform actions comprising:
receiving a tuning policy usable in constraining the provided tuning values to satisfy the tuning policy.

* * * * *